United States Patent [19]

Weinhold

[11] Patent Number: 4,913,470
[45] Date of Patent: Apr. 3, 1990

[54] AUTOMATICALLY ADJUSTABLE TUBE COUPLING FOR TUBES OF VARYING DIAMETERS

[76] Inventor: Karl Weinhold, Im Jagdfeld 23, 4040 Neuss 1, Fed. Rep. of Germany

[21] Appl. No.: 280,037

[22] Filed: Dec. 5, 1988

Related U.S. Application Data

[63] Continuation of Ser. No. 172,741, Mar. 23, 1988, abandoned, which is a continuation of Ser. No. 87,985, Aug. 17, 1987, abandoned, which is a continuation of Ser. No. 860,141, May 6, 1986, abandoned.

[30] Foreign Application Priority Data

Jun. 19, 1985 [DE] Fed. Rep. of Germany ....... 3521857
Jan. 16, 1986 [DE] Fed. Rep. of Germany ....... 3601093

[51] Int. Cl.$^4$ ............................................. F16L 33/12
[52] U.S. Cl. ..................................... 285/243; 285/420
[58] Field of Search ............... 285/176, 242, 243, 252, 285/253, 409, 412, 411, 420, 421; 24/271, 490

[56] References Cited

U.S. PATENT DOCUMENTS

| 455,967 | 7/1891 | Lusk et al. | 285/252 |
|---|---|---|---|
| 597,740 | 1/1898 | Pusey | 81/326 |
| 1,309,941 | 7/1919 | Herbst et al. | 24/271 |
| 1,680,956 | 8/1928 | Simonsen | 81/356 |
| 1,862,817 | 6/1932 | Eifel | 81/356 |
| 2,018,906 | 10/1935 | Winter | 24/271 |
| 2,725,246 | 11/1955 | Weinhold | 285/252 |
| 2,846,244 | 8/1958 | Parker | 24/271 |
| 3,600,770 | 8/1971 | Halling | 285/411 |
| 3,661,409 | 5/1972 | Brown | 24/285 |
| 3,866,956 | 2/1975 | Weinhold | 285/243 |
| 4,074,913 | 2/1978 | Weinhold | 285/243 |
| 4,272,871 | 6/1981 | Weinhold | 24/270 |
| 4,659,120 | 4/1987 | Weinhold | 285/243 |

FOREIGN PATENT DOCUMENTS

| 584692 | 10/1959 | Canada | 24/271 |
|---|---|---|---|
| V7140XII | 10/1955 | Fed. Rep. of Germany | 24/273 |
| 1425581 | 11/1968 | Fed. Rep. of Germany | 285/243 |
| 2005588 | 8/1971 | Fed. Rep. of Germany | 285/243 |
| 2051987 | 4/1972 | Fed. Rep. of Germany | 285/243 |
| 2523338 | 9/1976 | Fed. Rep. of Germany | 285/243 |
| 2611174 | 10/1977 | Fed. Rep. of Germany | 285/243 |
| 41319 | 2/1932 | France | 24/273 |
| 872811 | 10/1981 | U.S.S.R. | 81/341 |
| 638761 | 6/1950 | United Kingdom | 285/411 |
| 873265 | 7/1961 | United Kingdom | 24/271 |

*Primary Examiner*—Gary L. Smith
*Assistant Examiner*—Eric K. Nicholson
*Attorney, Agent, or Firm*—Sprung Horn Kramer & Woods

[57] ABSTRACT

The present invention relates to a tube coupling consisting of a collar formed by at least two shell portions connected at their peripheral end by means of a crossing joint bolt, and comprising further a bolt lever articulated at the free peripheral end of one of the shell portions and connected to the other shell portion by means of a locking spring. The characteristic feature of the invention is the fact that the joint bolt connecting the shell portions is guided in an oblong hole provided in one of said shell portions, the longitudinal axis of which extends in an acute angle α with respect to the joint line of the tube coupling towards the bolt lever in closed position, and that at the free peripheral end of the shell portions are formed stop faces which in case of smaller tube wall thicknesses get into contact before the closing position of the bolt lever is reached.

4 Claims, 2 Drawing Sheets

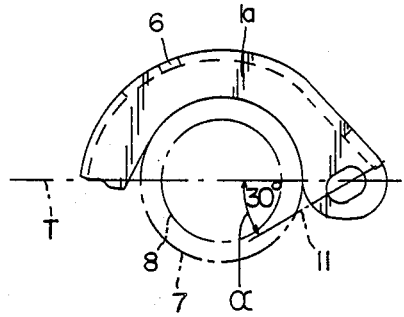
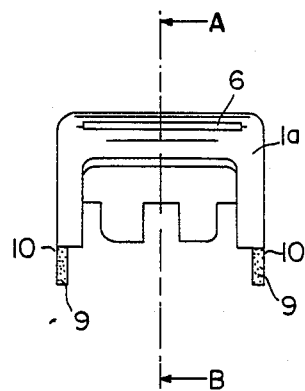
FIG.3  FIG.4
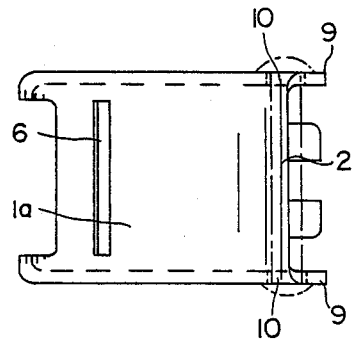
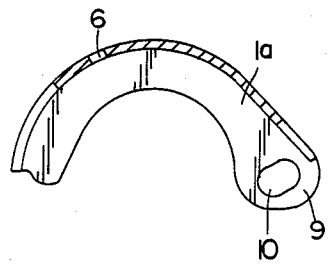
FIG.5  FIG.6

_4,913,470_

AUTOMATICALLY ADJUSTABLE TUBE COUPLING FOR TUBES OF VARYING DIAMETERS

This is a continuation of application Ser. No. 172,741, filed Mar. 23, 1988, now abandoned; which is a continuation of Ser. No. 087,985, filed Aug. 17, 1987, now abandoned, which is a continuation of Ser. No. 860,141, filed May 6, 1986 now abandoned.

BACKGROUND OF THE INVENTION

The present invention relates to a tube coupling consisting of a collar formed by at least two shell portions connected at their peripheral end by means of a crossing joint bolt, and comprising further a bolt lever articulated at the free peripheral end of one of the shell portions and connected to the other shell portion by means of a locking spring.

Such prior tube couplings are successfully used in practice. But in certain cases are used tubes having varying wall thicknesses. This leads to the drawback that tubes having smaller wall thicknesses than those for which the tube coupling has been designed cannot be securely clamped so that leaks may occur.

DE-GM 69 26 172 discloses a clamping ring and snap closure for tubes in which the shell portions are connected to each other at their peripheral ends by means of curved spring steel shackles. One of said spring steel shackles is articulated at the bolt lever. The pair of curved spring steel shackles permits to increase the shell portion distance so that the clamping ring also may be adapted to tubes having a larger wall thickness than the diameter for which it has been designed. Nevertheless, the connection of the shell portions by means of a curved spring steel shackle does not permit to clamp tubes having a smaller diameter than that for which the clamping ring of the state of art has been designed.

It is an object of the present invention to improve a tube coupling comprising the generic features such that with sufficient stability it may tightly clamp without risk of damage tubes of varying diamters on a mouthpiece, in particular tubes of smaller diameter than the minimum diameter for which the coupling has been designed. This means that for a varying amount of rubber between the mouthpiece and the collar the tube coupling has to automatically adjust in such a way that clamping is ensured also for smaller wall thicknesses.

SUMMARY OF THE INVENTION

In order to solve this object the invention suggests for a tube coupling of the above quoted type to guide the joint bolt connecting the shell portions in an oblong hole provided in one of said shell portions, the longitudinal axis of which extends in an acute angle $\alpha$ with respect to the joint line of the tube coupling towards the bolt lever in closed position, and that at the free peripheral end of the shell portions are formed stop faces which in case of smaller tube dimensions get into contact before the closing position of the bolt lever is reached.

The inventive tube coupling solves said object. Due to the stop faces provided at one end of the shell portions and due to the inclined oblong hole provided at the other end of one of the shell portions, said shell portions are able to enclose the existing amount of rubber in such a way that in case of tubes with small wall thickness the shell portions are displaced towards each other in the joint line. This permits to clamp also tubes having a smaller wall thickness without causing wrinkles in a secure and leak-tight manner on a mouthpiece.

DESCRIPTION OF THE DRAWINGS

The drawings show an embodiment example of the inventive tube coupling. Said drawings show in FIG. 1 a front elevation of the inventive tube coupling with its shell portions in one of the end positions, FIG. 2 a front elevation of the inventive tube coupling with its shell portions in the other end position, FIG. 3 a front elevation of the displaceable shell portion, FIG. 4 a side elevation, FIG. 5 a plan view of the displaceable shell portion, and FIG. 6 a sectional view along line A-B of the shell portion shown in FIG. 4.

DETAILED DESCRIPTION OF THE INVENTION

Figure 1:
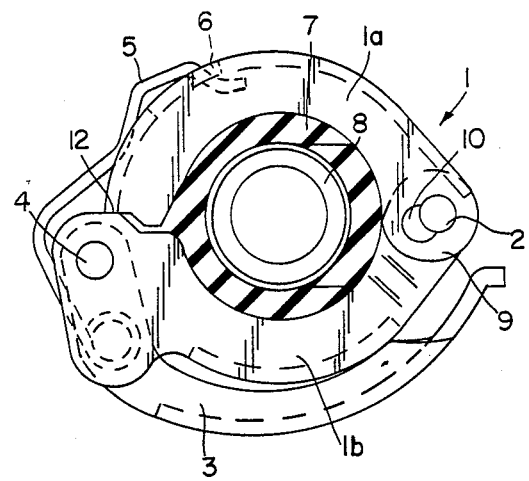

The inventive tube coupling consists in a manner known per se of a collar 1 comprising shell portions 1a, 1b movably connected at one of their peripheral ends by means of joint bolt 2 crossing eyes 9 provided in shell portions 1a, 1b. At lower shell portion 1b bolt lever 3 is tiltingly articulated around bolt 4. Closing spring 5 secured to bolt lever 3 engages slot 6 provided in upper shell portion 1a. During the closing operation of the tube coupling the flanks of U-sectional shell portions 1a, 1b engage tube 8 pushed onto mouthpiece 7.

In upper shell portion 1a is provided in each of eyes 9 an oblong hole 10 through which extends joint bolt 2. Apart from a tilting movement of shell portion 1a with respect to shell portion 1b, oblong holes 10 permit a displacement of the shell portions along longitudinal axis 11 of oblong holes 10. Longitudinal axis 11 extends by an angle of $\alpha$ of (in the present case) 30° with respect to joint line T of the tube coupling in the direction of closed bolt lever 3 (FIG. 1). This angle can be in the range of 25° to 45°. Longitudinal axis 11 of the oblong hole approximately forms a tangent line at the circumference of mouthpiece 8. Oblong hole 10 may also be provided in the other shell portion 1b.

Figure 2:
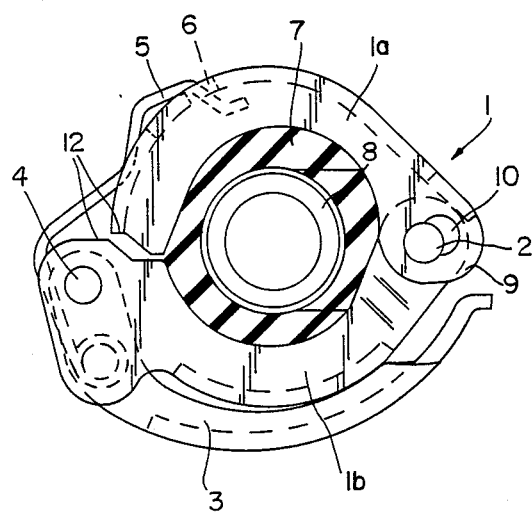

FIGS. 1 and 2 each show the tube coupling in closed position in which tube 7 is tightly clamped by means of collar 1 on mouthpiece 8. FIG. 1 shows shell portions 1a, 1b in the end position of bolt lever 2 restricted by oblong holes 10 as this automatically occurs when clamping a tube 7 having a smaller wall thickness when before reaching the closing position of bolt lever 3 stop faces 12 of shell portions 1 have come into contact while during further movement of the bolt lever into closing position the shell portions have been displaced towards each other in joint line T. FIG. 2 shows shell portions 1a, 1b in the other end position when clamping a tube 7 of larger wall thickness. In this case there has not occured any displacement of shell portions 1a and 1b.

In FIGS. 3 to 6 upper shell portion 1a is represented as individual part. FIGS. 4 and 5 show eyes 9 through which extends joint bolt 2 represented in dotted lines in FIG. 5.

I claim:

1. In a tube coupling comprising two shell members, each having internal surfaces forming a collar and two ends portions, means including a joint bolt for pivotally connecting one end portion of each member and locking means including a lever pivotally connected to the other end portion of one member about a pivot axis and means engageable with the other member for moving the other end portions of the two members toward each other into a closed position wherein a joint line is defined which extends between the joint bolt and the other end portions, the improvement wherein the means pivotally connecting the one end portions comprises means forming an oblong pivot slot in the other member having a longitudinal axis extending towards the lever at an acute angle with respect to the joint line which defines an area including said pivot axis to permit displacement of the other end portions of the two members toward each other along the joint line and wherein the other end portions of the two members have means forming stop faces thereon disposed between the pivot axis of the locking means and the joint bolt and configured to contact each other during movement of the two members into the closed positions around tubes having a given diameter to effect automatic displacement of the other end portions of the two members toward each other along the joint line.

2. The tube coupling as defined by claim 1, wherein the acute angle ranges between 25° and 45°.

3. The tube coupling as defined by claim 2, wherein the acute angle is 30°.

4. The tube coupling as defined by claim 1, wherein the means forming the stop faces comprises shoulders on the other end portions of the members.

* * * * *